(12) United States Patent
Failer

(10) Patent No.: US 6,493,300 B2
(45) Date of Patent: Dec. 10, 2002

(54) CD-ROM DRIVE HAVING ADJUSTABLE MULTIPLE SPEED RANGES

(75) Inventor: Albert Failer, Dasing (DE)

(73) Assignee: Fujitsu Siemens Computers GmbH, München (DE)

( * ) Notice: Subject to any disclaimer, the term of this patent is extended or adjusted under 35 U.S.C. 154(b) by 0 days.

(21) Appl. No.: 09/319,189

(22) PCT Filed: Dec. 5, 1997

(86) PCT No.: PCT/DE97/02843

§ 371 (c)(1),
(2), (4) Date: Jun. 2, 1999

(87) PCT Pub. No.: WO98/27549

PCT Pub. Date: Jun. 25, 1998

(65) Prior Publication Data

US 2001/0030923 A1 Oct. 18, 2001

(30) Foreign Application Priority Data

Dec. 19, 1996 (DE) .......................................... 196 53 109

(51) Int. Cl.$^7$ ................................................ G11B 3/90
(52) U.S. Cl. ................................. 369/53.12; 369/53.3
(58) Field of Search ........................... 369/47.36, 47.38, 369/47.44, 53.12, 53.13, 53.18, 47.14, 47.4, 47.41, 47.45, 47.46, 53.3, 53.35, 53.42, 53.43

(56) References Cited

U.S. PATENT DOCUMENTS 6,069,858 A * 5/2000 Endo et al. ................. 369/75.1
6,151,182 A * 11/2000 Koizumi et al. ........... 360/75 X

FOREIGN PATENT DOCUMENTS

| EP | 0 431 928 | 6/1991 |
|---|---|---|
| EP | 0 658 894 | 6/1995 |
| EP | 0 807 927 | 11/1997 |
| EP | 0 821 356 | 1/1998 |
| JP | 64-39659 | 2/1989 |
| JP | 2-101364 | 8/1990 |
| JP | 0 733 4950 | 12/1995 |
| JP | 08 007 498 | 1/1996 |
| JP | 08 227 561 | 9/1996 |
| JP | 09 251 702 | 9/1997 |
| WO | WO 96/28821 | 9/1996 |

OTHER PUBLICATIONS

"12X ATAPI CD–ROM Drive Unit DR–444 Product Specifications" Sep. 17. 1996, Pioneer Electronic Corporation, XP002066715, pg. 1–12.

Thompson: "Fast, Faster, Fastest: CD–ROM's New 8X, 10X, 12X Drives", EMEDIA Professional, vol. 10, No. 2, Feb. 1997, pgs. 30–50, XP002066713.

Anonymous: "Method for Select Rotational speed of Compact Disk–Read Only Memory Using Eject Button", IBM Technical Disclosure Bulletin, vol. 41, No. 1, Jan. 1998, p. 105.

* cited by examiner

Primary Examiner—Paul W. Huber
(74) Attorney, Agent, or Firm—Shiff Hardin & Waite

(57) ABSTRACT

Given a CD-ROM drive having a plurality of speed ranges selectable in n-fold graduation and having linearly reduced rotational speeds within each speed range respectively between outer and inner sector and having the prescription that a reduction of the rotational speed automatically ensues given a negative read result, control means are provided that effective switching into a lower speed range when a predetermined noise level is upwardly transgressed and/or when vibrations occur.

4 Claims, 2 Drawing Sheets

CD-ROM DRIVE HAVING ADJUSTABLE MULTIPLE SPEED RANGES

This application is a 371 of PCT/DE97/02843, filed Dec. 5, 1997.

BACKGROUND OF THE INVENTION

The invention is directed to a CD-ROM drive.

A prior art CD-ROM drive is disclosed in the publication, Pioneer Electronic Corporation XP0020066715, Sep. 17, 1996.

In conformity with the demands made of higher read performances, CD-ROM drives work with higher and higher speeds. Proceeding from single, double, through currently 8-fold speed, corresponding drives with speeds in the range from 500 through 6,500 rpm are offered, so that the drives can be set to different speed ranges as needed. By contrast to hard disk drives wherein an extremely precise adjustment and centering is possible due to the permanently installed hard disks, there is the problem given CD-ROM drives that an adequately exact centering can be achieved here for only a relatively small part of the data disks that can be inserted into the drive. Particularly given increasing speeds, this results therein that vibrations and/or running noises that considerably complicate and impede the work execution at a correspondingly equipped personal computer occur due to the non-optimum position given a majority of the data disks that are inserted. In addition to a high noise emission due to the drive, which can also extend onto the entire housing, this leads to unnecessarily high mechanical stresses of the drives, which in turn results in maintenance, repair and other consequential costs. Vibrations that occur at the CD-ROM drive can usually also be transmitted onto neighboring hard disk or floppy disk drives, so that their operation can be sensitively disturbed. Ultimately, this leads to dissatisfaction on the part of the customer, who no longer accepts CD-ROM drives overall.

As known, the tracks in a compact disk are applied in the form of a helix proceeding from inside to outside, whereby all sectors are of equal length, differing from a hard disk. Dependent on the operating mode of the CD-ROM drive, this means either that the speed of the compact disk is linearly reduced from, for example, 6,500 rpm to 3,000 rpm from the first sector arranged at the inside to the last sector arranged at the outside within a predetermined speed range (what is referred to as CLV mode) of that the speed remains constant, with the result that the read speed steadily increases toward the outside (what is referred to as CAV mode). When it then occurs that a sector cannot be faultlessly read, then the drive automatically switches into the next-lower speed range.

An analogous operation is not provided per se when vibrations and/or noise emissions occur. However, it has been disclosed for what are referred to as dual mode CAV|CLV drives (see the above-identified product specification of the Pioneer company, September 1996) that an automatic switch from CLV mode into the CAV modes ensues when vibrations occur, i.e. a switch to a speed that is constant within the selected speed range but that is somewhat lower overall, with the advantage that the risk of occurring resonances within the selected speed range is significantly lower given a fixed speed.

SUMMARY OF THE INVENTION

The present invention is based on the object of improving a CD-ROM drive in such a way that an operating sequence deteriorated due to vibrations and/or noise emissions can be avoided with simple means and the CD-ROM drive in turn returns into a malfunction-free operation.

In general the present invention is a CD-ROM drive having a plurality of speed ranges selectable in n-fold graduation and, optionally, having constant or linearly reduced rotational speeds within each speed range respectively between outer and inner circumference, with the prescription that a switching to a lower speed automatically ensues using control means when vibrations occur. A manually actuatable key for switching the drive into a speed range respectively lower by one step (n-1) is allocated to the control means for speed reduction.

Advantageous developments of the present invention are as follows.

The key for switching into a lower speed range is combined with the control key for the CD drawer transport and respectively one of the two functions can be triggered dependent on the duration of the key pressure.

The control key for the drawer transport is controllable such that, given brief-duration activation of the key, a speed reduction is triggered and, given longer key pressure, a transport motion of the CD drawer is triggered.

Advantageous developments of the invention are recited below. It is especially advantageous when the control key for switching the drive into a lower speed range is combined with the control key for the CD drawer transport because there is usually hardly any space for a further operating key given traditional drives. Dependent on the duration of the key pressure, either the function of speed reduction or the function of drawer transport is triggered.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1:
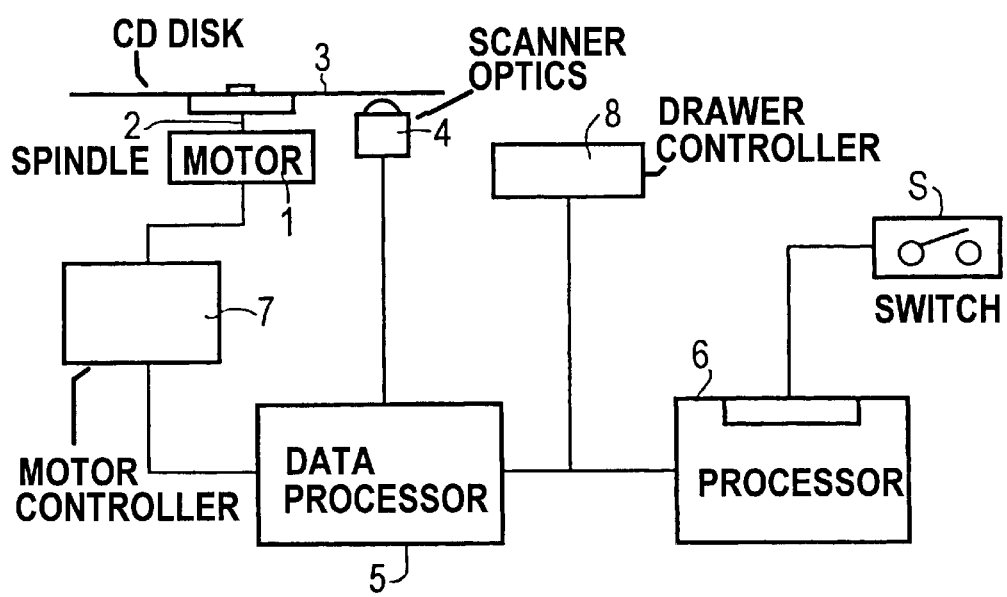
FIG. 1 depicts the schematic circuit diagram of a CD-ROM drive.

FIG. 1 shows the fundamental structure of a CD-ROM drive. It is composed of a spindle 2 driven with the assistance of a motor 1 and onto which a CD disk 3 is centrally placed. The signals picked up by the scanner optics 4 are supplied to a data processor 5 for further processing. Another processor 6 monitors, first, the respectively current position of a switch S and supplies control signals for the motor control 7 and the drawer control 8 that controls the transport of the CD disk 3 into the operating position, i.e. to the spindle 2, and from this point back into the removable station. Dependent on the on-time of the switch S, the processor 6 either supplies a signal to the motor control 7 for reducing the speed or a signal to the drawer control 8 for the transport of the CD disk from the operating position into the output position.

Figure 2:
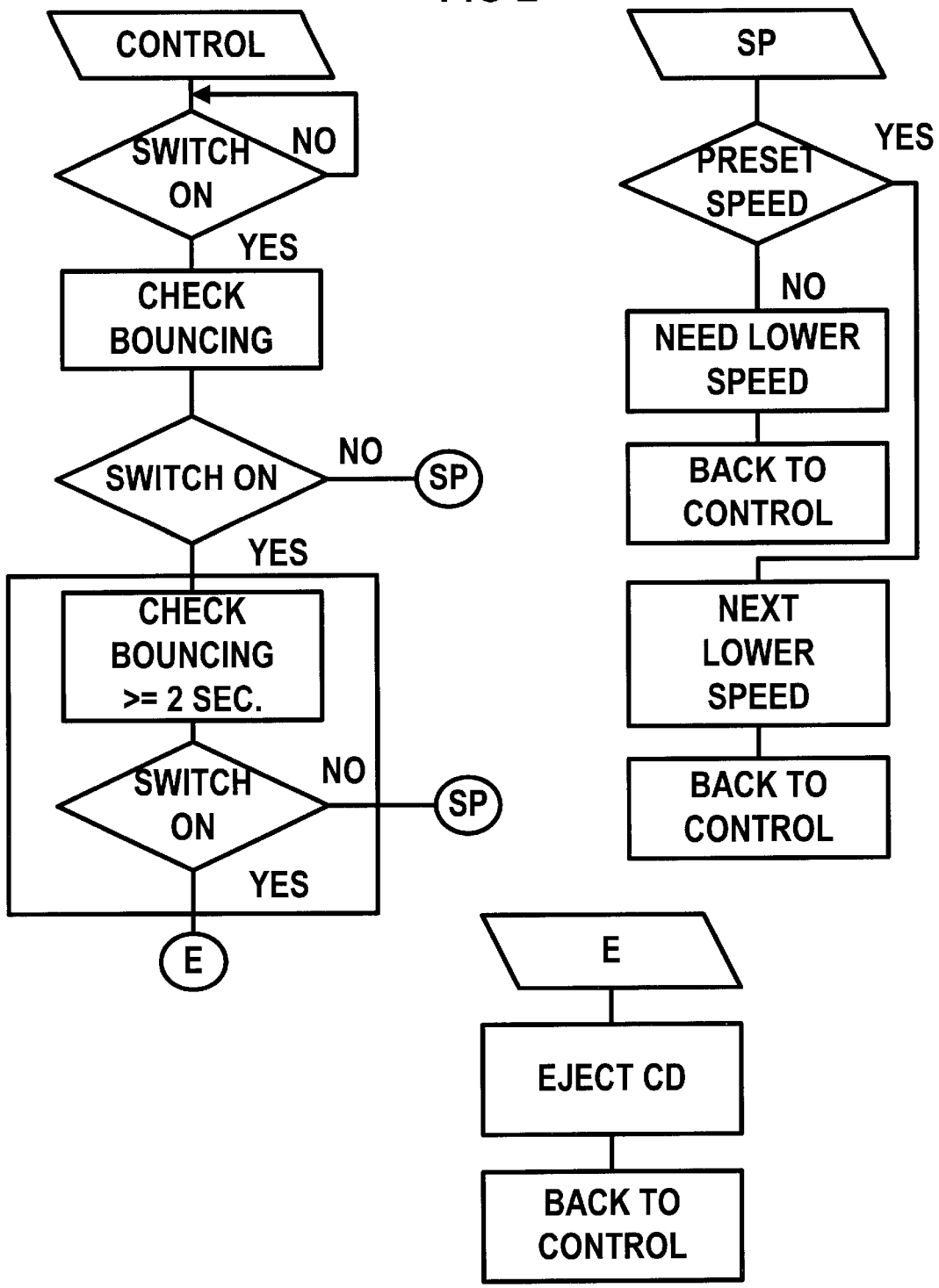
FIG. 2 is a flow chart for the inventive operation of the CD-ROM drive.

The operation of the CD-ROM drive shall be explained in yet greater detail on the basis of flow charts that are shown in FIG. 2. In the routine "monitor", the function of the switch S, i.e. its switch status -on/off -, is monitored in predetermined interrogation cycles. When the switch S is actuated, the change in switch status is variably monitored and checked for rebounding an active condition, for example for approximately 100 ns. When the switch is no longer active after a predetermined time span of, for example, less than 0.5 seconds, a branch is made into the routine "SB". Otherwise, i.e. when the switch remains active for a longer time, a check is carried out to see whether this active condition has lasted for at least two seconds. When this is true, a branch is made into the routine "E", which means that the CD disk is ejected, i.e. the drawer with the CD disk is opened. Upon insertion of a new data disk, the routine "E" returns to the routine "monitor".

Upon branching into the routine "SP", a check is initially carried out at the start as to whether speed rules must be adhered to. When this is not required, a switch can be immediately made to the next-lower rpm. This procedure can ensue via the monitoring routine until the drive turns with single rotational speed (approximately 500 rpm). When speed rules are required, the rotational speed is adapted to the requirements (for example, MPEG, 4-fold or audio, 1-fold) and is set.

In summary, the following operation thus derives. When the switch S is briefly pressed, for example for a maximum of only 0.5 seconds, then the processor 6 via the motor control 7 triggers a switching to a lower speed range. This operation can be repeated until previously occurring vibrations and/or excessively high noise emissions have either entirely disappeared or have at least been capable of being reduced to a bearable minimum extent. When the switch is pressed for a longer time, then the processor 6 triggers the ejection of the CD disk via the drawer control 8, whereupon the drawer together with CD disk is opened.

Given disturbing vibrations and/or noise emissions, the desired speed reduction can also be automatically produced with the assistance of acoustic and/or vibration sensors whose signals are supplied to the motor control 7 via the processor 6.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A CD-ROM drive having a plurality of speed ranges selectable in n-fold graduation and having nearly reduced rotational speeds within each speed range respectively between outer and inner sector, with the prescription that a reduction of the rpm automatically ensues given a negative read result, wherein a controller is provided that, independent of the negative read result, effects a switching into a lower speed range given at least one of: a) an upper transgression of a predetermined noise level, and b) when vibrations occur;

wherein a manually actuatable key of the CD_ROM and accessible during operation of the CD_ROM is allocated to the controller for speed reduction; and wherein the key-controlled speed reduction ensues with the assistance of an operating key for a CD drawer transport.

2. The CD-ROM drive according to claim 1, wherein the control key for the drawer transport is controllable such that a speed reduction is triggered given brief-duration activation of the key and a transport movement of the CD drawer is triggered given longer key pressure.

3. A CD-ROM drive having a plurality of ranges, comprising:

a controller that assists a switching to a lower speed automatically when read errors occur; and a manually actuable key of the CD_ROM and accessible during operation of the CD-ROM for switching the drive into a speed range respectively lower than that is allocated to the controller for speed reduction; and a CD drawer transport having a control key, wherein the key for switching into a lower speed range is combined with the control ky for the CD drawer transport and respectively one of these two functions can be triggered dependent on the duration of the key pressure.

4. The CD-ROM drive according to claim 3, wherein the control key for the drawer transport is controllable such that, given a brief duration activation of the key, a speed reduction is triggered and, given a longer key pressure, a transport motion of the CD drawer is triggered.

\* \* \* \* \*